United States Patent [19]
Tanaka

[11] Patent Number: 5,831,964
[45] Date of Patent: Nov. 3, 1998

[54] RECORDING MEDIUM HAVING FIRST TRACKS AND SECOND TRACKS AT DIFFERENT LEVELS AND WITH DIFFERENT RECORDING FORMATS

[75] Inventor: Toshihisa Tanaka, Yokohama, Japan

[73] Assignee: Nikon Corporation, Tokyo, Japan

[21] Appl. No.: 890,343

[22] Filed: Jul. 9, 1997

Related U.S. Application Data

[63] Continuation of Ser. No. 638,472, Apr. 26, 1996, abandoned.

[30] Foreign Application Priority Data

Apr. 27, 1995 [JP] Japan .................................... 7-103890

[51] Int. Cl.⁶ ...................................................... G11B 7/24
[52] U.S. Cl. ...................................... 369/275.3; 369/275.4
[58] Field of Search ............................ 369/275.4, 275.3, 369/275.2, 13, 58, 44.26, 277, 278, 272, 279

[56] References Cited

U.S. PATENT DOCUMENTS

| | | | |
|---|---|---|---|
| 4,423,502 | 12/1983 | Dil ........................................ | 369/275.4 |
| 4,858,218 | 8/1989 | Takagi et al. ............................ | 369/109 |
| 5,199,022 | 3/1993 | Suzuki et al. ......................... | 369/275.1 |
| 5,383,176 | 1/1995 | Inui et al. .............................. | 369/275.4 |
| 5,402,411 | 3/1995 | Maeda et al. .......................... | 369/275.4 |
| 5,444,682 | 8/1995 | Yamada et al. . | |
| 5,448,551 | 9/1995 | Miyagawa et al. . | |
| 5,459,705 | 10/1995 | Matoba et al. . | |
| 5,493,552 | 2/1996 | Kobori ................................. | 369/275.4 |
| 5,493,561 | 2/1996 | Nishiuchi et al. .................... | 369/275.4 |
| 5,499,229 | 3/1996 | Murakami et al. ................... | 369/275.4 |
| 5,508,995 | 4/1996 | Moriya et al. ........................ | 369/275.4 |
| 5,517,485 | 5/1996 | Nishiuchi et al. .................... | 369/275.4 |
| 5,568,461 | 10/1996 | Nishiuchi et al. . | |
| 5,602,824 | 2/1997 | Ooki et al. ............................ | 369/275.4 |

FOREIGN PATENT DOCUMENTS

| | | |
|---|---|---|
| 0 599 499 A3 | 9/1993 | European Pat. Off. . |
| 0 570 235 A3 | 11/1993 | European Pat. Off. . |
| 0 588305 A3 | 3/1994 | European Pat. Off. . |
| 0 626 679 A3 | 11/1994 | European Pat. Off. . |
| 0-626-679-A2 | 11/1994 | European Pat. Off. . |
| 0 628 952 A2 | 12/1994 | European Pat. Off. . |
| 5-197956 A | 8/1993 | Japan . |
| 5-282705 A | 10/1993 | Japan . |
| 5282705 | 10/1993 | Japan . |
| 7-044871 | 2/1995 | Japan . |
| 7-044872 A | 2/1995 | Japan . |
| 7-057272 | 3/1995 | Japan . |

OTHER PUBLICATIONS

N. Miyagawa, Y. Gotoh, E. Ohno, K. Nishiuchi, N. Akahira, "High Track Density Recording by Land and Groove Method on Phase Change Optical Disks", Technical Digest, Symposium on Optical Memory 1994, Jul. 11–13, 1994, (Waseda Univ., Tokyo, Japan).

Primary Examiner—Tan Dinh

[57] ABSTRACT

A disc, such as a magneto-optical disc or an optical disc, for recording data. The disk includes a first track and a second track. The first track is formed at a first level in the disc and is for recording data in a first format. The second track is formed at a second level in the disc and is for recording data in a second format. The first level is a different level than the second level, and the first format is a different format than the second format.

16 Claims, 4 Drawing Sheets

RECORDING MEDIUM HAVING FIRST TRACKS AND SECOND TRACKS AT DIFFERENT LEVELS AND WITH DIFFERENT RECORDING FORMATS

This application is a continuation of application Ser. No. 08/638,472, filed Apr. 26, 1996, now abandoned.

BACKGROUND OF THE INVENTION

1. Field of the Invention

The present invention relates to a recording medium such as a magneto-optical (MNO) disc or an optical disc and, more particularly, to a recording medium having land tracks and groove tracks at different levels in the recording medium and having different recording formats for storing data.

2. Description of the Related Art

There are various types of recording medium for storing data. Such recording medium include, for example, magneto-optical discs and optical discs having concentric, spiral grooves formed therein. The grooves function as tracks for storing data.

FIG. 5 is a diagram illustrating the track structure of a conventional recording medium. As illustrated in FIG. 5, a recording medium 60 has convex portions 61 and concave portions 62. Convex portions 61 have recording marks 63 formed thereon for storing data. No data is stored on concave portions 62. Alternatively, data can be stored on concave portions 62, without storing data on convex portions 61. In this case, recording marks 63 would be formed on concave portions 62 instead of on convex portions 61.

Moreover, it is desirable to store as much data as possible on a single recording medium. However, a conventional recording medium can only store a relatively small amount of data since data is not stored on both the concave portion and the convex portion of the recording medium.

SUMMARY OF THE INVENTION

Accordingly, it is an object of the present invention to provide a recording medium which stores data on both the concave portions and the convex portions of the recording medium, thereby increasing the amount of data which can be stored on the recording medium.

It is a further object of the present invention to provide optimum recording formats for a recording medium which stores data on both the concave portions and the convex portions of the recording medium.

Additional objects and advantages of the present invention will be set forth in part in the description which follows and, in part, will be obvious from the description, or may be learned by practice, of the present invention.

The foregoing objects of the present invention are achieved by providing a recording medium which includes a first track and a second track. The first track is formed at a first level in the recording medium and is for recording data in a first format. The second track is formed at a second level in the recording medium and is for recording data in a second format. The first level is a different level than the second level, and the first format is a different format than the second format.

Objects of the present invention are also achieved by providing a recording medium which includes a first track that forms a flat spiral at a first level in the recording medium and is centered around a center point of the recording medium. Data is recordable on the first track in a first format. A second track forms a flat spiral at a second level in the recording medium and is centered around the center point of the recording medium. The second track spirally extends adjacent to the flat spiral formed by the first track. Data is recordable on the second track in a second format. The first level is a different level than the second level, and the first format is a different format than the second format.

Further, objects of the present invention are achieved by providing a recording medium which includes a first track forming a flat spiral at a first level in the recording medium. The flat spiral formed by the first track is centered around a center point of the recording medium and begins to spiral from a first starting point positioned on a first radial line extending from the center point. Data is recordable on the first track. A second track forms a flat spiral at a second level in the recording medium. The flat spiral formed by the second track is centered around the center point of the recording medium and begins to spiral from a second starting point positioned on a second radial line extending from the center point, to spirally extend adjacent to the flat spiral formed by the first track. Data is recordable on the second track. The first level is a different level than the second level, and the first radial line is a different radial line than the second radial line.

Moreover, objects of the present invention are achieved by providing a recording medium having a first track forming a flat spiral at a first level in the recording medium and centered around the center point of the recording medium. Data is recordable on the first track in a plurality of recording regions, each recording region having a mark to indicate the beginning of the recording region. The mark is the same for each recording region of the first track. A second track forms a flat spiral at a second level in the recording medium and is centered around the center point of the recording medium. The flat spiral formed by the second track spirally extends adjacent to the flat spiral formed by the first track. Data is recordable on the second track in a plurality of recording regions, each recording region having a mark to indicate the beginning of the recording region. The mark is the same for each recording region of the second track. The first level is a different level than the second level. The mark of each recording region of the first track is a different mark than the mark of each recording region of the second track.

In addition, objects of the present invention are achieved by providing a recording medium having a plurality of first tracks and a plurality of second tracks. The plurality of first tracks are positioned at a first level in the recording medium and are concentrically arranged around a center point of the recording medium. Data is recordable on the plurality of first tracks in a first format. The plurality a second tracks are positioned at a second level in the recording medium. The plurality of second tracks respectively correspond to the plurality of first tracks and are concentrically arranged around the center point of the recording medium. Each second track of the plurality of second tracks is adjacent to the corresponding first track of the plurality of first tracks. Data is recordable on the plurality of second tracks in a second format. The first level is a different level than the second level, and the first format is a different format than the second format.

Objects of the present invention are also achieved by providing a recording medium having a plurality of first tracks at a first level in the recording medium and concentrically arranged around the center point of the recording medium. Each first track includes a plurality of recording regions on which data is recordable. Each recording region has a mark to indicate the beginning of the recording region. The mark is the same for each recording region of the plurality of first tracks. The recording medium also includes a plurality of second tracks at a second level in the recording medium. The plurality of second tracks respectively corresponding to the plurality of first tracks and are concentrically arranged around the center point of the recording medium. Each second track of the plurality of second tracks is adjacent to the corresponding first track of the plurality of first tracks. Each second track includes a plurality of recording regions on which data is recordable. Each recording region having a mark to indicate the beginning of the recording region, the mark being the same for each recording region of the plurality of second tracks. The first level is a different level than the second level. The mark of the recording regions of the plurality of first tracks is a different mark than the mark of the recording regions of the plurality of second tracks.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
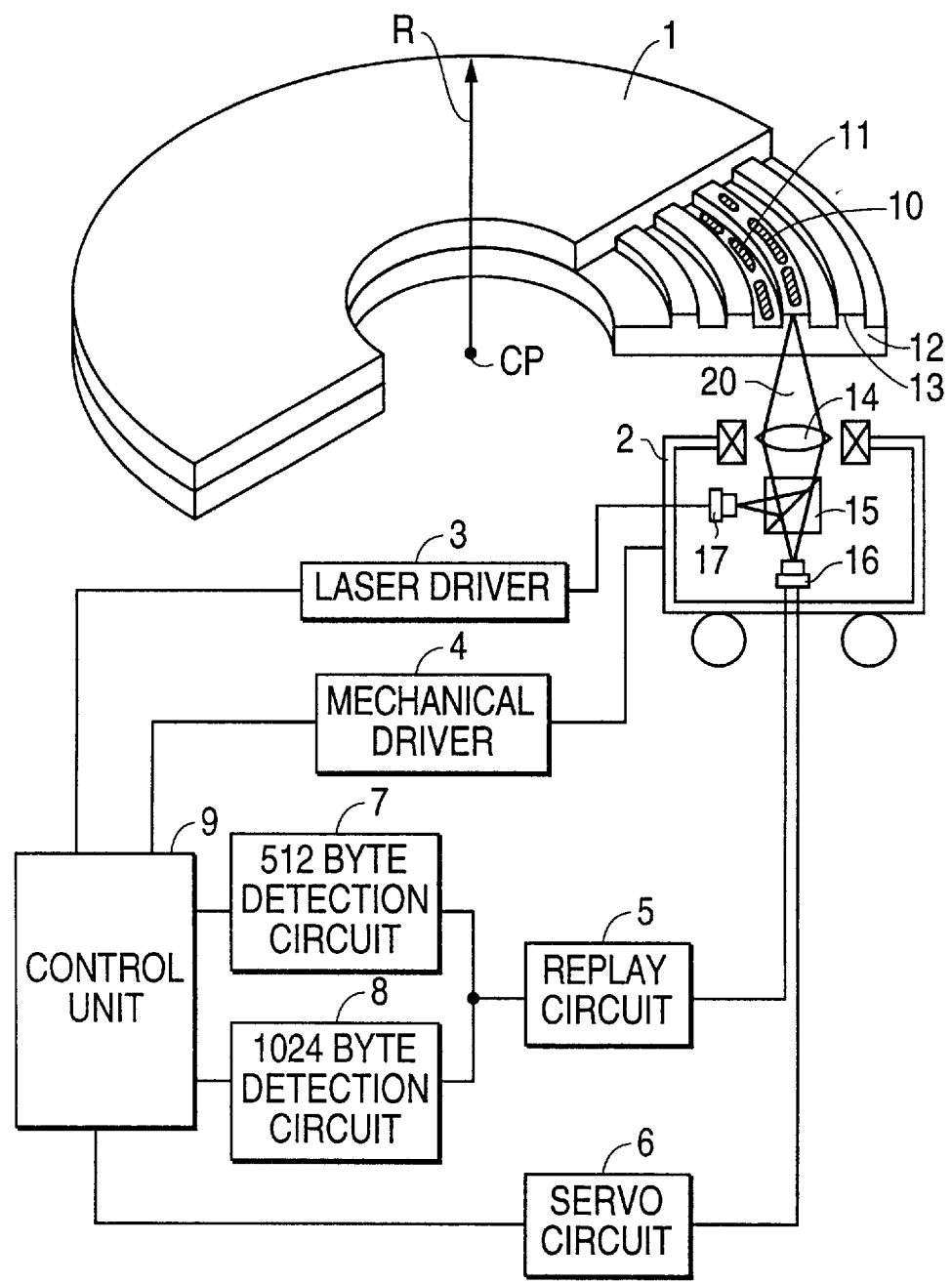
FIG. 1 is a diagram illustrating a recording medium and replay device, according to an embodiment of the present invention.

Reference will now be made in detail to the present preferred embodiments of the present invention examples of which are illustrated in the accompanying drawings, wherein like reference numerals refer to like elements throughout.

FIG. 1 is a diagram illustrating a recording medium and replay device, according to an embodiment of the present invention.

Referring now to FIG. 1, a disc-shaped recording medium 1 stores data. More specifically, recording medium 1 is a magneto-optical disc which rotates at, for example, 1,800 rpm by a spindle motor (not illustrated). An optical head 2 emits a light beam 20 towards recording medium 1 to read data recorded on recording medium 1.

Recording medium 1 includes a substrate 12 with land tracks 11 and groove tracks 10 formed thereon. Land tracks 11 are convex portions of recording medium 1, as seen from the illuminating direction of light beam 20. Groove tracks 10 are concave portions of recording medium 1, as seen from the illuminating direction of light beam 20. Land tracks 11 and groove tracks 10 have a respective difference in level of approximately $\frac{1}{7}\lambda$, where $\lambda$ is preferably the wavelength of light beam 20. A reflective layer 13 comprises metal (for example, aluminum) and is formed on the surface of substrate 12. Data is recorded on recording medium 1 by magnetic pits (not illustrated) and phase pits (not illustrated) formed in land tracks 11 and groove tracks 10.

Land tracks 11 and groove tracks 12 can each be spirally formed on disk recording medium 1 and centered around a center point CP of recording medium 1 (for example, as more fully illustrated in FIG. 3), or can be formed as concentric circles centered around center point CP.

Optical head 2 emits light beam 20 to replay data recorded on the recording medium 1, and is movable in the radial direction R of recording medium 1 extending from center point CP, so that an individual land track 11 or groove track 10 can be selectively accessed.

Optical head 2 includes an objective lens 14, a beam splitter 15, a detector 16 and a semiconductor laser 17. Semiconductor laser 17 emits light beam 20. Light beam 20 is then reflected by beam splitter 15 and focused by objective lens 14, to form a light spot on a respective land track 11 or groove track 10. After forming the light spot, light beam 20 is reflected by reflective layer 13 of recording medium 1, passes through objective lens 14, passes through beam splitter 15, and is then incident on detector 16. Detector 16 is preferably a photoelectric converter, such as a photodiode, and converts the incident light into electrical signals.

More specifically, detector 16 converts the incident light into replay signals and servo signals. The replay signals preferably are (a) phase pit signals for replaying data which has been recorded by phase pits on land tracks 11 and/or groove tracks 10, and (b) magneto-optical signals for replaying data which has been recorded by magnetic pits on land tracks 11 and/or groove tracks 10. The servo signals preferably include (a) track error signals for indicating the amount of displacement of light spots formed on a land track 11 or a groove track 10 of recording medium 1 with respect to a center line of the radial direction R of the respective track, and (b) focus error signals for indicating the amount of displacement of the focal point of light beam 20 with respect to the track surface of a land track 11 or a groove track 10.

The servo signals are input to a servo circuit 6 which process the servo signals. The processed servo signals are provided to a control unit 9. Control unit 9 uses the processed servo signals to control a mechanical drive 4 for driving a tracking actuator (not illustrated) and a focusing actuator (not illustrated) in optical head 2. In this manner, the position of the light spot formed by light beam 20 is set in position in the center of a respective land track 11 or groove track 10. In addition, the light spot is focused on the surface of the respective land track 11 or groove track 10.

Replay signals output from optical head 2 are provided to a replay circuit 5. Reply circuit then provides the replay signals to a 512 byte detection circuit 5 and a 1,024 byte detection circuit 8. Operation of 512 byte detection circuit 5 and 1,024 byte detection circuit 8 will be discussed in more detail later. However, output signals from 512 byte detection circuit 5 and 1,024 byte detection circuit 8 are provided to control unit 9. Control unit 9 then uses the output signals of 512 byte detection circuit 5 and 1,024 byte detection circuit 8 to determine whether a land track 11 or a groove track 10 is being read. Based on this determination, control unit 9 performs various control conditions. Such control conditions include control of semiconductor laser 17 through a laser driver 3.

Figure 2:
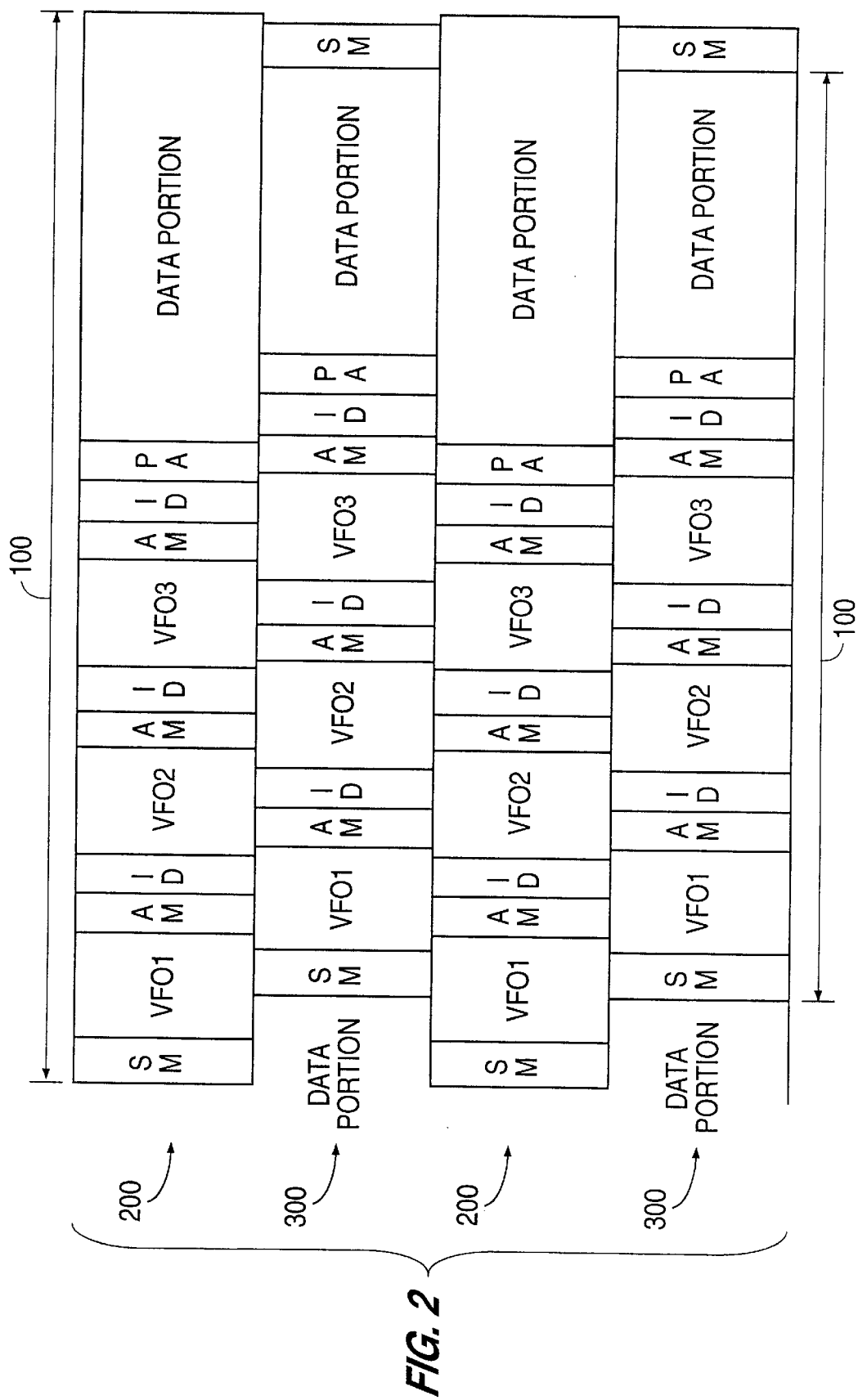
FIG. 2 is a diagram illustrating a recording format of the recording medium illustrated in FIG. 1, according to an embodiment of the present invention.

FIG. 2 is a diagram illustrating a recording format of sectors formed on recording medium 1, according to an embodiment of the present invention. More specifically, FIG. 2 illustrates the format of sectors formed on land tracks 11 and groove tracks 10 for recording data, wherein reference numeral 100 indicates one sector, reference numeral 200 indicates a sector formed on a land track with a 1 KB format, and reference numeral 300 indicates a sector formed on a groove track with a 512 byte format. Each sector 100 includes the following portions: sector mark (SM), variable frequency oscillator (VFO), address mark (AM), identification (ID), post-amble (PA), and data portion.

The sector mark (SM) indicates the beginning of the sector, and it is preferable for the sector mark (SM) to be easily distinguishable from other portions of the sector. Thus, the sector mark (SM) should be easily distinguishable from address portions, flag portions and data portions of the sector, such as the variable frequency oscillator (VFO), the address mark (AM), the identification (ID), the post-amble (PA) and the data portion. The sector mark (SM) can be easily distinguishable if, for example, it uses a data pattern not in the other portions or is longer than other portions of the sector.

The variable frequency oscillator (VFO) is a continuously repeating code pattern for accurately replaying data, even if the rotation of recording medium 1 changes. For example, the code pattern of the variable frequency oscillator (VFO) will change simultaneously with a change in the rotation of recording medium 1. A replay clock can then be created to cause a phase-locked-loop (PLL) to lock to the changing code pattern. The simultaneous changing of the code pattern of the variable frequency oscillator (VFO), combined with the replay clock and phase-locked loop (PLL), can then be used to accurately replay data recorded on recording medium 1.

The address mark (AM) is a special code pattern indicating the starting position for reading out an identification (ID) of the sector. The identification (ID) identifies the track number and sector number of the sector. The ID becomes of variable length because (2,7) modulation is typically performed. Therefore, the post-amble (PA) is used when the code length after modulation is not accepted in a predetermined region. The data portion is a region in which user data is written.

In the embodiment of the present invention as illustrated in FIG. 2, each sector on groove tracks 11 has a sector size of a 512 byte format, and each sector on land tracks 12 has a sector size of 1,024 byte format. More specifically, a 512 byte format indicates that the recording capacity of the data portion is a 512 byte sector format. Moreover, a 1,024 byte format indicates that the recording capacity of the data portion is a 1,024 byte sector format. Thus, the length in the track direction of the data portion is longer for a 1,024 byte format, as compared to a 512 byte format. Accordingly, the entire length of one sector is longer for a 1,024 byte sector, as compared to a 512 byte sector. Alternatively, the length sectors on groove tracks 11 and land tracks 12 can be reversed. That is, the sectors on groove tracks 11 could be a 1,024 byte format, with the sectors on land tracks 12 being a 512 byte format.

Referring again to FIG. 1, replay signals output from optical head 2 are input, via replay circuit 5, to 512 byte detection circuit 7 and 1,024 byte detection circuit 8. From the replay signals, 512 byte detection circuit 7 detects the length of data in the data portion of a sector which was read, and produces a detection signal if the length of the data is 512 bytes. Similarly, from the replay signals, 1,024 byte detection circuit 8 detects the length of data of the data portion of a sector, and produces a detection signal if the length of data is 1,024 bytes.

Control unit 9 receives the detection signals from 512 byte detection circuit 7 and 1,024 byte detection circuit 8. When 512 byte detection circuit 7 produces a detection signal, control unit 9 determines that the current track being replayed is a groove track. Similarly, when 1,024 byte detection circuit 8 produces a detection signal, control unit 9 determines that the current track being replayed is a land track. The determination by control unit 9 of whether the current track being replayed is a groove track or a land track can be used to establish various control conditions.

Figure 3:
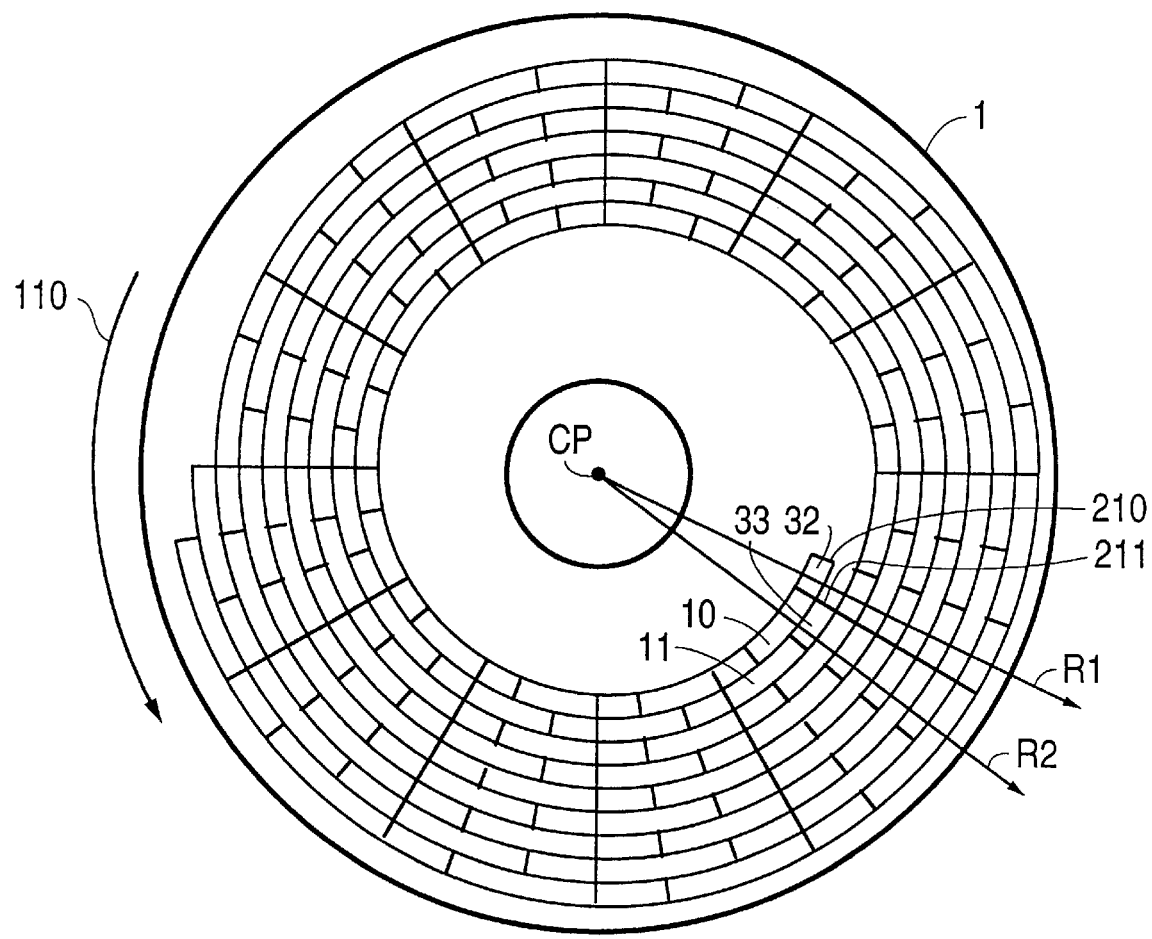
FIG. 3 is a diagram illustrating the track formation of a recording medium, according to an additional embodiment of the present invention.

FIG. 3 is a diagram illustrating the relative positioning of land tracks 11 and groove tracks 12 of recording medium 1, according to an additional embodiment of the present invention. Referring now to FIG. 3, arrow 110 indicates the direction of rotation of recording medium 1. Groove tracks 10 are formed in a spiral as a groove track spiral 210, and land tracks 11 are formed in a spiral as a land track spiral 211. Groove track spiral 210 and land track spiral 211 are concentrically arranged, adjacent spirals, as illustrated in FIG. 3, so that groove tracks 10 are adjacent to land tracks 11.

The position of a starting sector 32 of groove track spiral 210, and the position of the starting sector 33 of land track spiral 211, are different along the circumferential direction of recording medium 1. The position of the starting sector 32 is positioned more ahead, or earlier, than the position of the starting sector 33. Thus, starting sector 32 is on a first radial line R1 extending from the center point CP of the recording medium 1, and starting sector 33 is on a second radial line R2 extending from the center point CP of the recording medium 1. As illustrated in FIG. 3, R1 and R2 are different radial lines of recording medium 1. The length in the circumferential direction of recording medium 1 of each sector is the same for adjacent groove tracks and land tracks. As a result, for adjacent groove tracks and land tracks, the starting position of sectors in the groove tracks will be ahead of the starting position of sectors in land tracks.

Alternatively, land track spiral 211 and groove track spiral 210 can be arranged so that the starting sector 33 of land track spiral 211 is ahead of the starting sector 32 of groove track spiral 210.

In the above embodiments of the present invention, as illustrated by FIG. 2, each sector has a sector mark (SM) to indicate the beginning of the sector. Generally, the same sector mark (SM) is used in all tracks. That is, land tracks 11 and groove tracks 10 use the same sector mark (SM).

Figure 4:
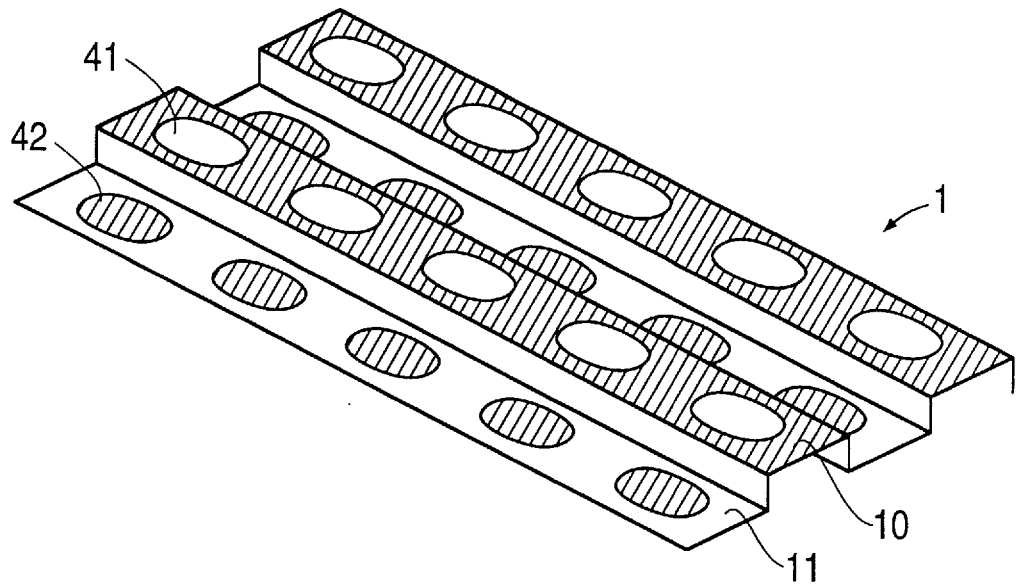
FIG. 4 is a diagram illustrating the track structure of a recording medium, according to a further embodiment of the present invention.
Figure 5:
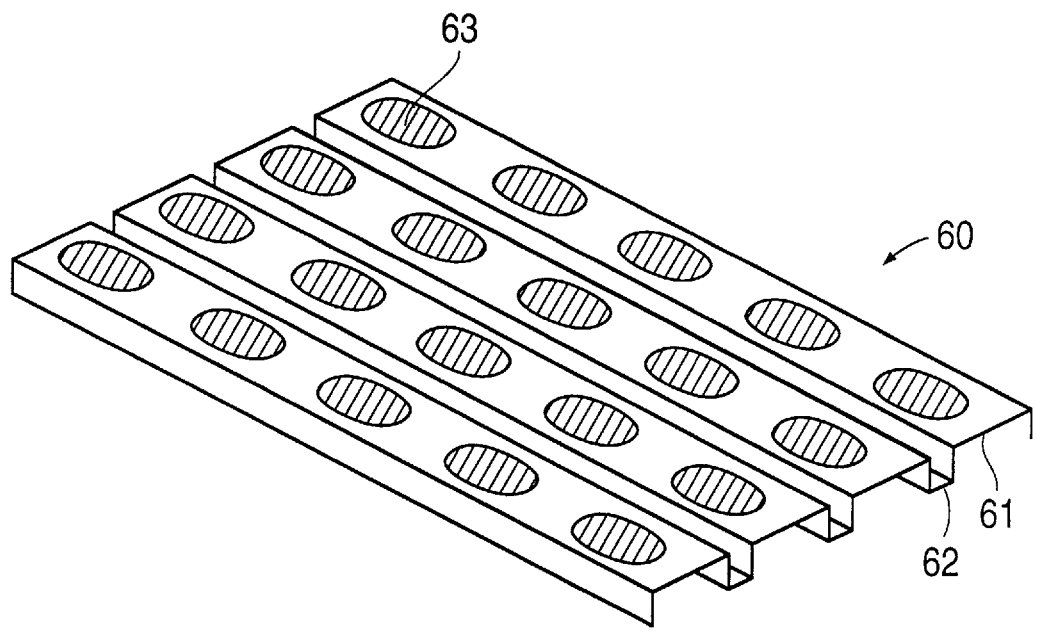
FIG. 5 (prior art) is a diagram illustrating the track structure of a conventional recording medium.

FIG. 4 is a diagram illustrating the track structure of recording medium 1, and shows regions of sector marks on recording medium 1, according to a further embodiment of the present invention. The embodiment of the present invention as illustrated in FIG. 4 uses different sector marks for different types of tracks. More specifically, in the embodiment of the present invention as illustrated in FIG. 4, land tracks 11 use a different sector mark (SM) than groove tracks 10.

Referring now to FIG. 4, laser light (not illustrated) for data replay illuminates recording medium 1 from below. Sector marks 41 are sector marks of groove tracks 10, and represent a binary "1" when the level of the replay signal is high. In contrast, sector marks 42 are sector marks of land tracks 11, and represent a binary "0" when the replay signal is high. Thus, the polarity of the binary signals written in sector marks is reversed in groove tracks 10 as compared to land tracks 11.

For example, during the recording of a binary signal "1" in a groove track 10, sector marks 41 are formed so that the amount of light incident on detector 16 becomes large when replaying. By contrast, during the recording of a binary signal "1" in a land track 11, sector marks 42 are formed so that the amount of light incident of detector 16 becomes small when replaying. Alternatively, during the recording of a binary signal "1" in a groove track 10, sector marks 41 can be formed so that the amount of light incident on detector 16 becomes small when replaying. In this case, during the recording of a binary signal "1" in a land track 11, sector marks 42 should be formed so that the amount of light incident of detector 16 becomes large when replaying.

Similar effects to those illustrated by FIG. 4 can be obtained with magneto-optical recording in groove tracks and land tracks if the direction of perpendicular magnetization film is reversed according to the binary signals to be recorded.

According to the above embodiments of the present invention, track grooves include a concave portion and a convex portion. A first track is formed on the concave portion, and a second track is formed on the convex portion. The first track and the second track each have sectors formed thereon for recording data. In this manner, the storage capacity of the recording medium can be increased, as compared to a recording medium which records data on only the concave portion or the convex portion of track grooves. Moreover, by having a different format for sectors of the first track as compared to the format for sectors of the second track, it is possible to discriminate whether the first track or the second track is being replayed. Moreover, the format for sectors of the first track being different from the format for sectors of the second track provides a two-in-one recording medium.

According to the above embodiments of the present invention, the starting position of the sectors of the first track is different from the starting position of the sectors of the second track. Therefore, even if there is leakage of data between the first track (for example, a land track) and the second track (for example, a groove track), it is possible to accurately replay the ID portion of the sectors.

Moreover, according to the above embodiments of the present invention, by changing the polarity of the sector marks of the sectors formed on the first track and the second track, even if there is leakage between the first track (for example, a land track) and the second track (for example, a groove track), it is possible to accurately replay the ID portion of the sectors.

Moreover, the first track and the second track may be partitioned into a plurality of recording regions. Then, the recording format of sectors of the first track can be made to be different from the recording format of sectors of the second track by varying the size of the recording regions. Further, the recording format of the sectors of the first track can be made to be different from the recording format of the sectors of the second track by using different starting positions in the track circumferential direction for the first track as compared to the second track.

According to the above embodiments of the present invention, a recording medium includes a first track and a second track on which information is recorded. The first track and second track are arranged on the recording medium in spiral form, and are at different levels in the radial direction of the recording medium. The recording format of sectors of the first track is different from the recording format of sectors of the second track.

Moreover, according to the above embodiments of the present invention, the sectors of the first track and the second track are partitioned into multiple recording regions having a predetermined format. The sizes of the recording regions differ in the sectors of the first track as compared to the sectors of the second track.

The present invention is described as relating to magneto-optical discs and optical discs. However, the present invention is applicable to many other types of recording medium. Moreover, the present invention is not intended to be limited to a "disc" shaped recording medium, and is applicable to recording medium of many different shapes.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording medium having a center point, comprising:
   a first track forming a flat spiral at a first level in the recording medium and centered around the center point of the recording medium, data being recordable on the first track in a first format; and
   a second track forming a flat spiral at a second level in the recording medium and centered around the center point of the recording medium, the second track spirally extending adjacent to the flat spiral formed by the first track, data being recordable on the second track in a second format, wherein the first level is a different level than the second level, the first format and the second format each provide a data portion for recording data, and the data portion of the first format is a different byte size than the data portion of the second format.

2. A recording medium as in claim 1, wherein the recording medium is an optical disc.

3. A recording medium having a center point, comprising:
   a first track forming a flat spiral at a first level in the recording medium and centered around the center point of the recording medium, data being recordable on the first track in a plurality of recording regions, each recording region having a mark to indicate the beginning of the recording region, the mark being the same for each recording region of the first track; and
   a second track forming a flat spiral at a second level in the recording medium and centered around the center point of the recording medium, the flat spiral formed by the second track spirally extending adjacent to the flat spiral formed by the first track, data being recordable on the second track in a plurality of recording regions, each recording region having a mark to indicate the beginning of the recording region, the mark being the same for each recording region of the second track, wherein the first level is a different level than the second level and the mark of each recording region of the first track is a different mark than the mark of each recording region of the second track.

4. A recording medium as in claim 3, wherein a polarity of the mark of each recording region of the first track is opposite a polarity of the mark of each recording region of the second track.

5. A recording medium as in claim 3, wherein the recording medium is an optical disc.

6. A recording medium having a center point, comprising:
   a plurality of first tracks at a first level in the recording medium and concentrically arranged around the center point of the recording medium, data being recordable on the plurality of first tracks in a first format; and
   a plurality a second tracks at a second level in the recording medium, the plurality of second tracks respectively corresponding to the plurality of first tracks and concentrically arranged around the center point of the recording medium, each second track of the plurality of second tracks being adjacent to the corresponding first track of the plurality of first tracks, data being recordable on the plurality of second tracks in a second format, wherein the first level is a different level than the second level, the first format and the second format each provide a data portion for recording data, and the data portion of the first format is a different byte size than the data portion of the second format.

7. A recording medium as in claim 1, wherein the recording medium is an optical disc.

8. A recording medium as in claim 6, wherein each first track of the plurality of first tracks and each second track of the plurality of second tracks includes a plurality of recording regions formed thereon for storing data, each recording region having a mark for indicating the beginning of the recording region, and each recording region on a respective first track having an adjacent recording region on the corresponding second track, wherein, for each first track of the plurality of first tracks, the mark of each recording region on the first track is positioned on a different radial line extending from the center point than the mark of the adjacent recording region of the corresponding second track.

9. A recording medium having a center point, comprising:

a plurality of first tracks at a first level in the recording medium and concentrically arranged around the center point of the recording medium, each first track including a plurality of recording regions on which data is recordable, each recording region having a mark to indicate the beginning of the recording region, the mark being the same for each recording region of the plurality of first tracks; and a plurality of second tracks at a second level in the recording medium, the plurality of second tracks respectively corresponding to the plurality of first tracks and concentrically arranged around the center point of the recording medium, each second track of the plurality of second tracks being adjacent to the corresponding first track of the plurality of first tracks, each second track including a plurality of recording regions on which data is recordable, each recording region having a mark to indicate the beginning of the recording region, the mark being the same for each recording region of the plurality of second tracks, wherein the first level is a different level than the second level and the mark of the recording regions of the plurality of first tracks is a different mark than the mark of the recording regions of the plurality of second tracks.

10. A recording medium as in claim 9, wherein a polarity of the mark of the recording regions of the plurality of first tracks is opposite a polarity of the mark of the plurality of recording regions of the second track.

11. A recording medium as in claim 10, wherein the recording medium is an optical disc.

12. A recording medium, comprising:

a first track formed at a first level in the recording medium and for recording data in a first format; and a second track formed at a second level in the recording medium and for recording data in a second format, wherein the first level is a different level than the second level, the first format and the second format each provide a data portion for recording data, and the data portion of the first format is a different byte size than the data portion of the second format.

13. A recording medium as in claim 12, wherein the recording medium is one of the group consisting of a magneto-optical disc and an optical disc.

14. A recording medium as in claim 3, wherein the mark of each recording region of the first track and the mark of each recording region of the second track is recorded by magneto-optic recording.

15. A recording medium as in claim 9, wherein the mark of each recording region of each first track and the mark of each recording region of each second track is recorded by magneto-optic recording.

16. A recording medium comprising:

a first track formed at a first level in the recording medium and including a plurality of recording regions, each recording region having a mark to indicate the beginning of the recording region; and a second track formed at a second level in the recording medium and including a plurality of recording regions, each recording region having a mark to indicate the beginning of the recording region, wherein the first level is a different level than the second level, the mark of each recording region of the first track and the mark of each recording region of the second track is recorded by magneto-optic recording, and the mark of the recording regions of the first track is different than the mark of the recording regions of the second track.

* * * * *